United States Patent
Meirosu et al.

(10) Patent No.: US 9,832,092 B2
(45) Date of Patent: Nov. 28, 2017

(54) METHOD AND NETWORK ENTITY FOR EVALUATING A LINK BETWEEN A FIRST NETWORK NODE AND A SECOND NETWORK NODE

(71) Applicant: TELEFONAKTIEBOLAGET L M ERICSSON (PUBL), Stockholm (SE)

(72) Inventors: Catalin Meirosu, Solna (SE); Daniel Gillblad, Åkersberga (SE); Rebecca Steinert, Grödinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 252 days.

(21) Appl. No.: 14/767,488

(22) PCT Filed: Feb. 14, 2013

(86) PCT No.: PCT/SE2013/050126
§ 371 (c)(1),
(2) Date: Aug. 12, 2015

(87) PCT Pub. No.: WO2014/126513
PCT Pub. Date: Aug. 21, 2014

(65) Prior Publication Data
US 2016/0036673 A1    Feb. 4, 2016

(51) Int. Cl.
H04L 12/26 (2006.01)
H04L 12/24 (2006.01)
H04L 12/801 (2013.01)

(52) U.S. Cl.
CPC ........ H04L 43/0829 (2013.01); H04L 41/145 (2013.01); H04L 43/0852 (2013.01); H04L 47/16 (2013.01)

(58) Field of Classification Search
CPC ... H04L 43/0829; H04L 47/16; H04L 41/145; H04L 43/0852
See application file for complete search history.

(56) References Cited

U.S. PATENT DOCUMENTS 6,700,895 B1 * 3/2004 Kroll ................ H04L 47/10
                                                  370/412
6,734,878 B1   5/2004 DeLuca et al.
(Continued)

FOREIGN PATENT DOCUMENTS

EP      1734690 A1    12/2006
EP      2469760 A1     6/2012
WO   2008/137614 A1   11/2008

OTHER PUBLICATIONS

McFarland, et al., Ethernet OAM: Key Enabler for Carrier class Metro Ethernet Services, IEEE Communications Magazine, vol. 43, Nov. 2005, pp. 152-157.

(Continued)

Primary Examiner — Andrew Lai
Assistant Examiner — Harry H Kim

(57) ABSTRACT

A method and a network entity for evaluating a link between a first and a second network node are disclosed. The link is configured to carry data packets between the network nodes via a third network node. The link comprises a first segment and a second segment. The network entity obtains an indication of a measurement tool to be used in a measurement session for evaluation of the link. The network entity selects a mathematical model based on the indication. The network entity generates measurement values by executing the measurement session. The network entity determines a first and a second value relating to lost data packets of the first and second segments, respectively, based on the measurement values and the selected mathematical model. The network entity identifies at least one of the first and second segments based the first and second values.

23 Claims, 6 Drawing Sheets

(56) References Cited

U.S. PATENT DOCUMENTS

| | | | |
|---|---|---|---|
| 2003/0115321 A1* | 6/2003 | Edmison | H04L 1/20 709/224 |
| 2003/0128692 A1* | 7/2003 | Mitsumori | H04L 41/22 370/352 |
| 2008/0089240 A1 | 4/2008 | Toomey et al. | |
| 2008/0279105 A1 | 11/2008 | Absillis et al. | |
| 2010/0265838 A1* | 10/2010 | Yamasaki | H04L 41/5009 370/252 |
| 2012/0236726 A1 | 9/2012 | Shihada et al. | |

OTHER PUBLICATIONS

Varga, et al., Integration of Service-Level Monitoring with Fault Management for End-to-End Multi-Provider Ethernet Services. IEEE Transactions on Network and Service Management 4(1) (2007), pp. 28-38.

Steinert, D. et al., Long-term adaptation and distributed detection of local network changes, IEEE Globecom 2010, Miami, Florida, USA, 2010, 5 pages.

Datar, et al., Maintaining stream statistics over sliding windows, In Proceedings of the Thirteenth Annual ACM-SIAM Symposium on Discrete Algorithms, Jan. 6-8, 2002, San Francisco, CA, USA. ACM/SIAM, 2002, pp. 635-644.

Cohen, et al., Maintaining time-decaying stream aggregates, In Proceedings of the 2003 ACM Symposium on Principles of Database Systems (PODS 2003), ACM, Jun. 9-12, 2003, 11 pages.

Santitoro, Metro Ethernet Services—A Technical Overview. http://www.metroethernetforum.org., Apr. 2003, 19 pages, v.2.5, Metro Ethernet Forum, U.S.A.

Prieto, et al., Toward Decentralized Probabilistic Management, IEEE Communications Magazine, vol. 49, issue 7, Jul. 2011, pp. 80-86.

Gaeta, et al., On the use of Petri Nets for the computation of completion time distribution for short TCP transfers, Applications and Theory of Petri Nets, 24th International Conference, Springer, 2003, pp. 181-200.

ITU-T Rec. Y.1731, OAM Functions and Mechanisms for Ethernet Based Networks, Feb. 2008, 82 pages.

Frost, et al., Packet Loss and Delay Measurement for MPLS Networks, RFC6374, Sep. 2011, 52 pages.

Ethernet Services Attributes Phase 2, Metro Ethernet Forum, Technical Specification MEF 10.1, Nov. 2006, 65 pages.

Postel, Internet Control Message Protocol, STD 5, RFC792, USC/Information Sciences Institute, Sep. 1981, 21 pages.

Kompella, et al., Detecting Multi-Protocol Label Switched (MPLS) Data Plane Failures, RFC4379, Feb. 2006, 50 pages.

Malkin, Trace route Using an IP Option, Network Working Group, RFC 1393,1993, 7 pages.

Bolot, End-to-End Packet Delay and Loss Behavior in the Internet, Proc. SIGCOMM '93, Sep. 1993, pp. 289-298.

Kumar, Probability distributions conditioned by the available information: Gamma distribution and moments. Lecture Notes in Computer Science, vol. 2865, 2003, pp. 289-304.

Mukherjee, On the Dynamics and Significance of Low Frequency Components of Internet Load, Internetworking: Research and Experience, vol. 5, 54 pages, Dec. 1992.

Kalman, et al., Modeling the delays of successively transmitted internet packets, IEEE Conference on Multimedia and Expo, Taipei, Taiwan, 4 pages, Jun. 2004.

Yang, et al., Transient Behaviors of TCP-friendly Congestion Control Protocols, In Proceedings of the Conference on Computer Communications (IEEE Infocom), Anchorage, AK, Apr. 2001, pp. 1716-1725.

Yajnik, et al., Measurement and modeling of the temporal dependence in packet loss, In Proceedings of IEEE INFOCOM '99, Mar. 1999, 8 pages.

\* cited by examiner

METHOD AND NETWORK ENTITY FOR EVALUATING A LINK BETWEEN A FIRST NETWORK NODE AND A SECOND NETWORK NODE This application is a 371 of International Application No. PCT/SE2013/050126, filed Feb. 14, 2013, the disclosure of which is fully incorporated herein by reference.

TECHNICAL FIELD

Embodiments herein relate to communication networks, such as telecommunication networks and computer networks. Furthermore, embodiments herein illustrate a method and a network entity for evaluating a link between a first and a second network node.

BACKGROUND

Institute of Electrical and Electronics Engineers (IEEE) and Internet Engineering Task Force (IETF) has defined network node capabilities for performance and fault management through the means of Operations, Administration and Management (OAM) protocols. In general, such protocols are handled by two types of entities located on the network node; Maintenance End-Points (MEP) and Maintenance Intermediate Points (MIP). The MEPs are located at the Ingress and egress of a network path, a tunnel, a virtual circuit, a link or a service. The MIPs are situated at the nodes that are part of the network path between the ingress and egress of the network path. Currently, the MEPs are active, which means that they can initiate measurement sessions. In contrast, the MIPs are passive, which means that they may only reply to requests or forward measurement packets that are not addressed to them.

The OAM tools for fault management and performance analysis are based on the standardization work of IETF and the International Telecommunication Union (ITU). For example, recommendations for Ethernet OAM functions are given in ITU-T Rec. Y.1731, titled "OAM Functions and Mechanisms for Ethernet Based Networks", issue February/2008. For Multi-Protocol Label Switching Transport Profiles (MPLS-TP), performance measurements are defined in RFC 6374, titled "Packet Loss and Delay Measurement for MPLS Networks" to D. Frost and S. Bryant, dated September 2011. For Internet Protocol (IP) networks, a so called trace-route tool is specified in RFC 1393, titled "Trace-route Using an IP Option" to G. Malkin, Network Working Group, from 1993.

An overview of existing OAM protocols for fault management and performance monitoring at different layers, e.g. MPLS, IP, and Ethernet, is presented in IEEE Communications Magazine, vol. 43, pp. 152-157, November 2005, "Ethernet OAM: Key Enabler for Carrier class Metro Ethernet Services" to M. McFarland, S. Salam, and R. Checker. In this overview, necessary usage requirements in the continued standardization work of the protocols are discussed.

With existing OAM tools localization of performance degradations on segments between MIPs is cumbersome due to additional measurements. In many cases, it is even impossible to achieve such localization of performance degradations or anomalies on links between MIPs.

FIG. 1 shows a known network, comprising MEPs and MIPS. The MIPS are shown as triangles. An expected success rate E for links $Y_1$ to $Y_4$ is to be determined by use of a trace-route tool. A link, see $Y_4$, comprises segments $X_1$ to $X_4$.

Table 1 shows an exemplifying result from a trace-route tool when run in the network of FIG. 1. The first column of table 1 presents the number of the segment, i.e. the number of each of $X_1$ to $X_4$. The following three columns comprise the delay measured between the MEP and a particular MIP, e.g. the links $Y_1$ to $Y_4$. The numbering of the segments coincides with numbering of MIPs. Sometimes a MIP is referred to as a hop. Though, the last hop is the egress MEP for the trace-route tool. A segment may sometimes be referred to as a hop. Letters A through J represent IP-addresses, such as 66.249.95.219, www.mydomain.com, for different MIPs.

TABLE 1

Output from a known trace-route tool

| Hop # | T1 (ms) | T2 (ms) | T3 (ms) | MIP |
|---|---|---|---|---|
| 1 | 19 | 1 | 1 | A |
| 2 | 1 | 1 | 1 | B |
| 3 | 2 | 2 | 2 | C |
| 4 | 24 | 40 | 22 | D |
| 5 | 3 | 2 | 2 | E |
| 6 | 22 | 22 | 23 | F |
| 7 | 2 | 7 | 2 | G |
| 8 | 3 | 3 | 2 | H |
| 9 | 22 | 22 | 22 | I |
| 10 | 21 | 21 | 21 | J |

For hop 4 in the left-most column, it can be observed that some of the probe packets exhibit a significantly higher delay than other probe packets, i.e. 40 ms, compared to 22-24 ms. A similar artifact is exhibited on line 7, where we have 7 ms compared to 2 ms. If a network operator tries to determine which segment is responsible for the increase in delay, the information made available by the trace-route tool is not enough in order to do an unambiguous identification of the segment, or segments, where the degradation occurred.

In the example above, an operator may conclude that the segments between MIPs 3-4 and 6-7 are degraded. However, such a judgment actually disregards the fact that the trace-route probe packets are sent individually at pre-defined intervals and thus encounter different network conditions. Hence, a degraded segment, e.g. in the form of a transient problem, observed due to report of delayed packet to MIP 4 may have finished by the time another packet, which was sent to MIP 7, arrives.

Therefore, a problem in relation of the example above is that manual processes for identifying segments responsible for performance degradations in packet networks are error-prone and provide ambiguous results.

Furthermore, it is known to operate OAM tools proactively. This means that the OAM tool is run periodically, with a fixed time interval that is configured when the OAM tool is installed into a network. The fixed time interval is kept constant as long as the proactive operations mode is enabled. With a short fixed time interval, a high rate of invocations of the tool is obtained. The network is then loaded with traffic, generated by the OAM tool. Hence, performance, in terms of capacity for other traffic than that generated by the OAM tool, is degraded. Oppositely, a low rate of invocations of the OAM tool is likely to miss degradations that were short-lived, but still may affect performance of the network negatively.

According to known solutions, the above mentioned problem may be solved by the provision of dedicated probing nodes. This means that the MIPs and MEPs are replaced by the dedicated probing nodes, each of which includes dedicated management software.

In case an OAM tool, based on the above mentioned Y.1731 for Ethernet OAM functions, is employed, the dedicated probing nodes cannot be used, because the MEPs cannot be placed on the data plane other than on the ingress and egress of a particular tunnel, such as an E-LINE. Moreover, the use of dedicated probing nodes is rather expensive to install and operate. In addition, planning with respect to the placement of the probing nodes within the network is required. Attempts in applying methods resembling dedicated probing have been done as in e.g. http://www.jdsu.com/ProductLiterature/EthernetAccess_TN_CPO_TM_AE.pdf.Disadv antageously, flexibility of the network is also reduced, since the placement of the probing nodes needs to be re-planned in response to any changes in the topology of the network.

SUMMARY

An object is provide an improved method for operations, administration and management of a network of the above mentioned kinds, which method overcomes or at least alleviates the above mentioned problems and/or disadvantages.

According to an aspect, the object is achieved by a method for evaluating a link between a first network node and a second network node. The link is configured to carry data packets between the first and second network nodes via at least one third network node. The link comprises at least a first segment configured to carry data packets between the first and third network nodes and a second segment configured to carry data packets between the second and third network nodes. The network entity obtains an indication of a measurement tool to be used in a measurement session for evaluation of the link. The network entity selects a mathematical model based on the indication of the measurement tool. The network entity generates a set of measurement values by executing the measurement session while using the measurement tool according to the indication of the measurement tool. The network entity determines a first and a second value relating to lost data packets of the first and second segments, respectively, based on the set of measurement values and the selected mathematical model. The network entity identifies at least one of the first and second segments based the first and second values.

According to another aspect, the object is achieved by a network entity configured to evaluate a link between a first network node and a second network node. The link is configured to carry data packets between the first and second network nodes via at least one third network node. The link comprises at least a first segment configured to carry data packets between the first and third network nodes and a second segment configured to carry data packets between the second and third network nodes. The network entity comprises a processing circuit configured to obtain an indication of a measurement tool to be used in a measurement session for evaluation of the link. The processing circuit is further configured to select a mathematical model based on the indication of the measurement tool and to generate a set of measurement values by executing the measurement session while using the measurement tool according to the indication of the measurement tool. Moreover, the processing circuit is configured to determine a first and a second value relating to lost data packets of the first and second segments, respectively, based on the set of measurement values and the selected mathematical model. Furthermore, the processing circuit is configured to identify at least one of the first and second segments based the first and second values.

Embodiments herein enable inferring, or determining, per-segment delay and loss estimates based on results collected from OAM and measurement tools between the first network node and the at least one third network node along the link in a packet network. In this manner, degradations or changes of the link may be localized to the first and/or second segment. Such localization of degradations is a first step towards taking corrective actions to improve performance, in for example terms of drop rate, of the network.

In contrast to network monitoring methods that require dedicated probing nodes as described above, the embodiments herein offers reliable and resource-efficient means for network monitoring and performance analysis, while requiring a constant, relatively small, amount of memory that mainly scales with the number of statistical counters per observed segment, such as the first and second segments. According to embodiment herein few arithmetic operations are required. Furthermore, a set of counter that scales with the number of segments are used. Embodiments herein may therefore be implemented to operate in network environments in which the computational resources are very restricted.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
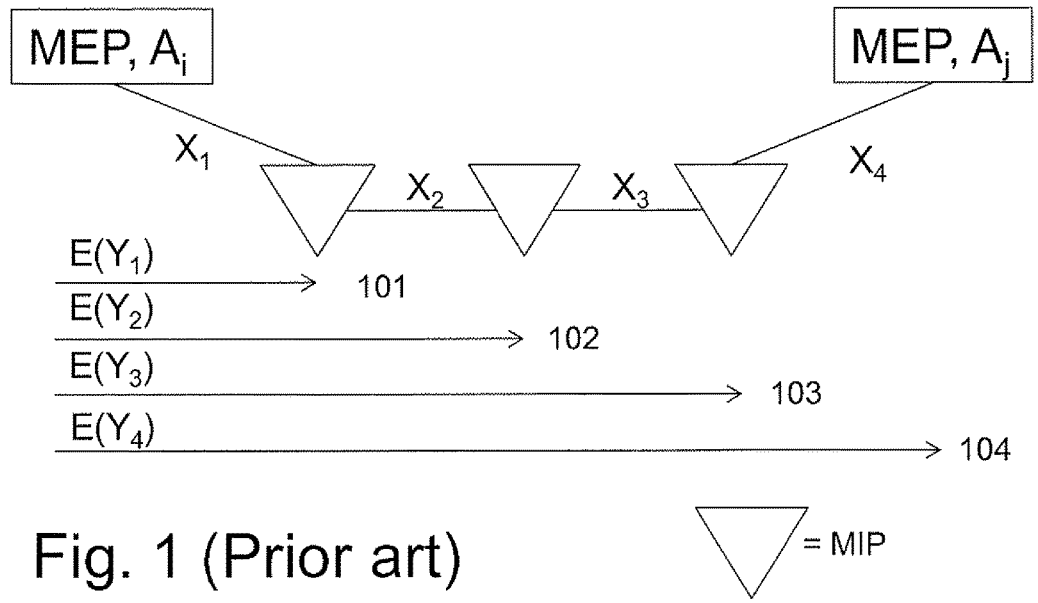
FIG. 1 shows a schematic overview of a known network.

Throughout the following description similar reference numerals have been used to denote similar elements, network nodes, parts, items or features, when applicable. In the Figures, features that appear in some embodiments are indicated by dashed lines unless otherwise indicated in the text.

Before the embodiments are described in more detail, some observations regarding probes will be discussed. A probe may sometimes be referred to as a measurement message, such as trace-route or loopback message.

Probes sent between MEPs are handled differently depending on whether the probes can be regarded as one single measurement or not. In view of statistical modelling, this distinction between when a probe can be regarded as a single measurement or not, it controls how the measurements are modeled. This means that probes are modelled as dependent or as independent measurements. The dependent measurements may be successive hop-by-hop measurements, e.g. accounting for co-variation between the hops. The independent measurements originate from the MEP with successive hop increments.

For dependent measurements, it is required that the probes can be handled as one single observation of the link, capturing the momentous network behavior. This requirement is fulfilled when the probing approach is based on successive hop-by-hop increments, such that each measured segment depends on the measured outcome of previous segments. In case a burst of probes measures the connection, it is necessary that the connection is statistically stationary such that the dependency relation between the probes can be preserved.

For independent measurements, a different model is used such that each probe is handled without accounting for any covariance between the hops. The independence assumption implies a statistically non-stationary condition on the connection. This means that the connection varies between each sent probe in a burst, and that each probe is regarded as one independent observation of the connection.

Which model for modelling of the measurements depends on whether successive probing or probe bursts will be used, and whether the link is statistically stationary or non-stationary.

Probes $\pi_t$ are periodically sent from the originating MEP and incremented for measuring latency and/or drop over a link $Y_i$ consisting of segments $X_1, X_2, \ldots, X_i$ towards the MIP/MEP node at $n_i \in N$. This is shown in FIG. 1, in which the probes 101 to 104 are sent from MEP $A_i$.

The outcome of each measurement is stored in a set of statistical counters for each segment. Once the measurements over the link $Y_i$ are collected, necessary statistics such as mean and variance on individual segments $X_i$ can be extracted mathematically from statistical counters for observed link latency and drop.

Stationary and non-stationary measurement conditions are likely to influence how link loss is modelled relative the probing strategy.

However, if the available probing tools allows it, individual link loss can also be modelled independently from stationary or non-stationary measurement conditions, and is here based on the assumption that link drop, or rather the success rate, on each link is stochastically independent, such that $E(X_1 X_2) = E(X_1)E(X_2)$. Previous studies indicate that temporal correlation in link drop depends mainly on the time scale within which drop is measured. See for example "J. C. Bolot. End-to-End Packet Delay and Loss Behavior in the Internet. Proc. SIGCOMM '93, pp. 289-298, September 1993", "Y. Yang, M. Kim, and S. Lam. Transient Behaviors of TCP-friendly Congestion Control Protocols. In Proceedings of the Conference on Computer Communications (IEEE Infocom) (Anchorage, Ak., April 2001), pp. 1716-1725", "M. Yajnik, S. Moon, J. Kurose, and D. Towsley. Measurement and modeling of the temporal dependence in packet loss. In Proceedings of IEEE INFOCOM '99, March 1999". This implies that link drop can be sufficiently modelled under the assumption of statistical independence, provided that: 1) the probes do not have significant impact on the link load, and 2) that the connection is free from congestion.

In the stochastically independent setting, each measurement may be a burst of probes, or may be one probe that is forwarded hop-by-hop until a drop occurs and that successively sends probe replies backwards to the originating MEP. Regardless of the measurement approach, the 0/1 outcome of a packet being transmitted over the link is $$Y_i = \prod_{j=1}^{i} X_j.$$

The success rate of a link $Y_i$ is under the independence assumption $$E(Y_i) = \prod_{j=1}^{i} E(X_j).$$

The expected success rate on the individual link $X_i$ can therefore be computed from:

$$E(X_i) = \frac{E(Y_i)}{E(Y_{i-1})} \qquad \text{equation 1}$$

or alternatively:

$$E(X_i) = \frac{E(Y_i Y_{i-1}) - \text{Cov}(Y_i, Y_{i-1})}{E(Y_{i-1})^2} \qquad \text{equation 2}$$

and from equation 1 or 2 the drop rate for segment $X_i$ can be trivially computed from $1 - E(X_i)$.

Note that, as the drop rate clearly can be modelled based on a discrete Bernoulli distribution with outcome 0/1, estimations of the variance is trivial once the mean success rate is obtained.

It is necessary that the observed successful transactions between the originating MEP and the endpoint always are $E(Y_{i-1}) \geq E(Y_i)$. Whenever this condition is not fulfilled, it is necessary to set $E(Y_{i-1}) = E(Y_i)$ in order to keep $0 \leq E(X_i) \leq 1$ such that the success rate would on certain segments be 1, thereby representing a perfect segment in terms of no drop. In practice, this situation can occur as an effect of random fluctuations in the sampling process. As such conditions reflect uncertainty it is necessary to perform additional probes to obtain reasonable statistics.

The obtained statistics can then be used for parameter estimation if desired. As statistical independence is assumed, a Bernoulli distribution is here sufficient to model link drop, representing the 0/1 outcome of a probe on each link. In R. Gaeta, M. Gribaudo, D. Manini, and M. Sereno. On the use of Petri nets for the computation of completion time distribution for short TCP transfers. Applications and Theory of Petri Nets, 24th International Conference, pages 181-200, Springer, 2003, modelling link drop as a Bernoulli distribution is discussed. The success rate parameter of the distribution can be estimated from the maximum likelihood of the observations, which relates directly to the observed average success rate, $\lambda$:

$$\lambda_i = E(X_i) \qquad \text{equation 3}$$

For long-term adaptation and comparison of estimates (e.g. for the purpose of change detection), the estimate in equation 3 can be further modified to take prior estimates into account:

$$\lambda_i = \frac{nE(X_i) + \alpha \lambda_i^*}{n + \alpha} \quad \text{equation 4}$$

where α controls the impact of the prior in the new estimate, and n is the number of observed samples.

Figure 2:
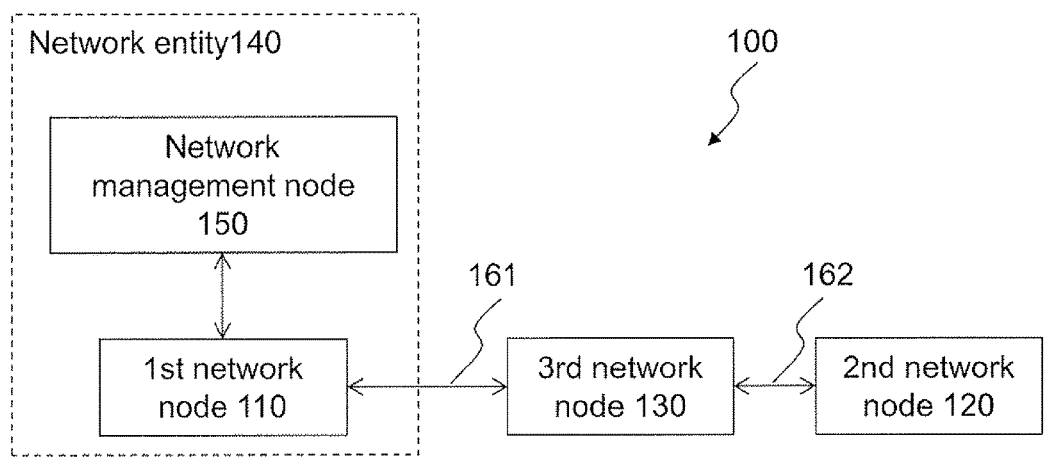
FIG. 2 shows a schematic overview of an exemplifying network, in which embodiments herein may be implemented.

FIG. 2 depicts an exemplifying communication network 100 in which embodiments herein may be implemented. In this example, the communication network is a MPLS-TP network. In other examples, the communication system may be an IP network, an Ethernet network or the like.

The communication network 100 comprises a first network node 110, such as a first MEP, and a second network node 120, such as a second MEP.

Furthermore, the communication network 100 comprises a third network node 130, such as a MIP. It shall be understood that only one third network node is shown for simplicity. That is to say, in other examples, the communication network 100 may comprise further third network nodes.

According to some examples, the first network node 110 may be comprised in a network entity 140.

The network entity 140 may comprise a network management node 150, such as a network management system (NMS).

A link between the first and second network nodes 110, 120 comprises a first segment 161 and a second segment 162. The first segment connects the first network node 110 to the third network node 130. The second segment connects the second network node 120 to the third network node 130.

Figure 3:
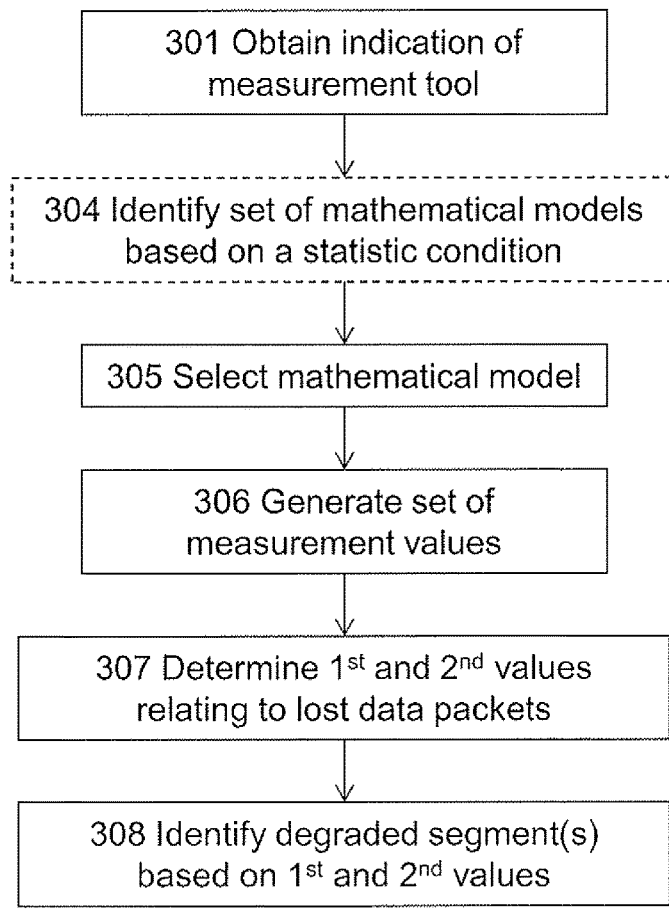
FIG. 3 shows a schematic flowchart illustrating methods according to embodiments herein.

FIG. 3 illustrates an exemplifying method for evaluating the link between the first and second network nodes 110, 120. The link is configured to carry data packets between the first and second network nodes 110, 120 via at least one third network node 130. The link comprises at least a first segment configured to carry data packets between the first and third network nodes 110, 130 and a second segment configured to carry data packets between the second and third network nodes 120, 130. The link may be a multi-segment Ethernet link, multi-segment Internet Protocol link, a multi-segment pseudo-wire or a MPLS-TP label switched path or the like. The link does to change during the measurement session, i.e. the underlying topology is fixed during a measurement session as in action 306.

In this example, the method is performed by the network entity 140. As mentioned above, the network entity 140 may be the first network node 110 or the network entity 140 may be the network management node 150.

The following actions may be performed in any suitable order.

Action 301

The network entity 140 obtains an indication of a measurement tool to be used in a measurement session for evaluation of the link.

When the network entity 140 is the first network node 110, the network entity 140 obtains the indication of the measurement tool by receiving the indication of the measurement tool from a network management node 150.

When the network entity 140 is the network management node 150, the network entity 140 obtains the indication of the measurement tool by receiving the indication of the measurement tool from an operator.

This means that the indication of the measurement tool may be manually selected by the operator. For example, the operator may specify which tools should be used, e.g. use this method only for MPLS-TP LM tools, and not for Ethernet Y.1731 tools that are deployed in the same network.

Furthermore, the operator may choose to run an investigation manually on-demand for a particular measurement tool, and then the network management system would assist in choosing the correct models and intermediary nodes, plus automatically performing the measurements and determining the segment that is degraded, or problematic.

Action 304

The network entity 140 may identify a set of mathematical models adapted to the measurement session while taking into account whether data packets carried on the link are modelled under a statistical condition of stationarity or non-stationarity. Stationary or non-stationary conditions for the link has been explained above. In action 305, a mathematical model is selected from the set of mathematical models.

Action 305

The network entity 140 selects a mathematical model based on the indication of the measurement tool.

The selected mathematical model may be equation 1 or 2. As mentioned above, equation 1 is $$E(X_i) = \frac{E(Y_i)}{E(Y_{i-1})}$$

and equation 2 is $$E(X_i) = \frac{E(Y_i Y_{i-1}) - \text{Cov}(Y_i, Y_{i-1})}{E(Y_{i-1})^2},$$

where $X_i$ is a segment, $E(X_i)$ is the estimated success rate on the segment $X_i$, $E(Y_i)$ is the observed success rate for link $Y_i$ (i.e. the average of successfully transmitted packets from the MEP over all segments X included in Y), Cov is covariance.

Action 306

The network entity 140 generates a set of measurement values by executing the measurement session while using the measurement tool according to the indication of the measurement tool. In this manner, the network entity 140 collects the set of measurement values relating to the link to be evaluated.

Action 307

The network entity 140 determines a first and a second value relating to lost data packets of the first and second segments, respectively, based on the set of measurement values and the selected mathematical model.

Action 308

The network entity 140 identifies at least one of the first and second segments based the first and second values. Said at least one of the first and second segments may be identified as changed, for example degraded or available if previously not available. The change may be expressed in terms of lost data packets. In this context, "available" may be that the first and/or second segment can, or is able to, carry data at a certain bit rate.

In some examples, the network entity 140 identifies at least one of the first and second segments by selecting a predefined number of the first and second segments for which the respective first and second values are the greatest among the first and second values. As an example, when the predefined number is two, the network entity 140 may select two segments that are associated to the two greatest values among the at least the first and second values.

In some examples, the network entity 140 identifies at least one of the first and second segments by selecting one of more of the first and second segments for which the respective first and second values are greater than a first predetermined threshold value for lost data packets. In this example, the network entity 140 selects those segments for which the respective value is higher than the first predetermined threshold.

In some examples, the network entity 140 identifies at least one of the first and second segments by determining a respective value indicative of a change in terms of lost data packets for each of the first and second segments based on the first and second value, respectively, and by selecting one or more of the first and second segments for which the respective value indicative of the change is greater than a second predetermined threshold value for change detection.

Figure 4:
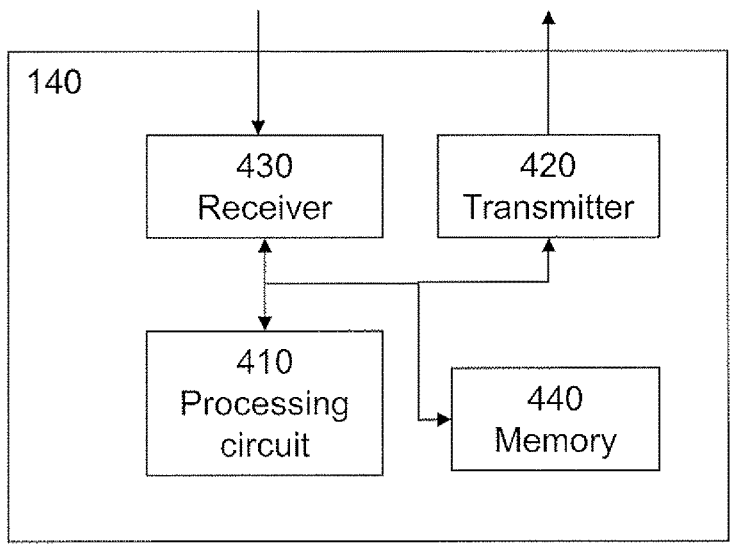
FIG. 4 is a schematic block diagram illustrating an exemplifying network entity configured to perform the methods illustrated in FIG. 3.

With reference to FIG. 4, a schematic block diagram of the network entity 140 is shown. The network entity 140 is configured to evaluate a link between a first network node 110 and a second network node 120.

As mentioned, the link is configured to carry data packets between the first and second network nodes 110, 120 via at least one third network node 130. The link comprises at least a first segment configured to carry data packets between the first and third network nodes 110, 130 and a second segment configured to carry data packets between the second and third network nodes 120, 130. The link may be a multi-segment Ethernet link, multi-segment Internet Protocol link, a multi-segment pseudo-wire or a MPLS-TP label switched path or the like.

Again, the network entity 140 may be the first network node 110 or the network management node 150.

The network entity 140 comprises a processing circuit 410 configured to obtain an indication of a measurement tool to be used in a measurement session for evaluation of the link. The processing circuit 410 may further be configured to receive the indication of the measurement tool from a network management node 150. The processing circuit 410 may further be configured to receive the indication of the measurement tool from an operator.

The processing circuit 410 is further configured to select a mathematical model based on the indication of the measurement tool.

The processing circuit 410 may further be configured to identify a set of mathematical models adapted to the measurement session while taking into account whether data packets carried on the link are modelled under a statistical condition of stationarity or non-stationarity, wherein the selected mathematical model is selected from the set of mathematical models.

The selected mathematical model may be equation 1 or 2. As mentioned, equation 1 is $$E(X_i) = \frac{E(Y_i)}{E(Y_{i-1})}$$

and equation 2 is $$E(X_i) = \frac{E(Y_i Y_{i-1}) - \text{Cov}(Y_i, Y_{i-1})}{E(Y_{i-1})^2},$$

where $X_i$ is a segment, $E(X_i)$ is the estimated success rate on the segment $X_i$, $E(Y_i)$ is the observed success rate for link $Y_i$ (i.e. the average of successfully transmitted packets from the MEP over all segments X included in Y), Cov is covariance.

The processing circuit 410 is further configured to generate a set of measurement values by executing the measurement session while using the measurement tool according to the indication of the measurement tool;

The processing circuit 410 is further configured to determine a first and a second value relating to lost data packets of the first and second segments, respectively, based on the set of measurement values and the selected mathematical model.

The processing circuit 410 is further configured to identify at least one of the first and second segments as degraded, in terms of lost data packets, based the first and second values.

The processing circuit 410 may further be configured to select a predefined number of the first and second segments for which the respective first and second values are the greatest among the first and second values.

The processing circuit 410 may further be configured to select one of more of the first and second segments for which the respective first and second values are greater than a first predetermined threshold value for lost data packets.

The processing circuit 410 may further be configured to determine a respective value indicative of a change in terms of lost data packets for each of the first and second segments based on the first and second value, respectively, and to select one or more of the first and second segments for which the respective value indicative of the change is greater than a second predetermined threshold value for change detection.

The processing circuit 410 may be a processing unit, a processor, an application specific integrated circuit (ASIC), a field-programmable gate array (FPGA) or the like. As an example, a processor, an ASIC, an FPGA or the like may comprise one or more processor kernels.

The network entity 140 further comprises a transmitter 420, which may be configured to send one or more values and/or parameters described herein.

The network entity 140 further comprises a receiver 430, which may be configured to receive one or more values and/or parameters described herein.

The network entity 140 further comprises a memory 440 for storing software to be executed by, for example, the processing circuit. The software may comprise instructions to enable the processing circuit to perform the method in the network entity 140 as described above in conjunction with for example FIG. 3. The memory may be a hard disk, a magnetic storage medium, a portable computer diskette or disc, flash memory, random access memory (RAM) or the like. Furthermore, the memory may be an internal register memory of a processor.

Figures 5A, 5B:
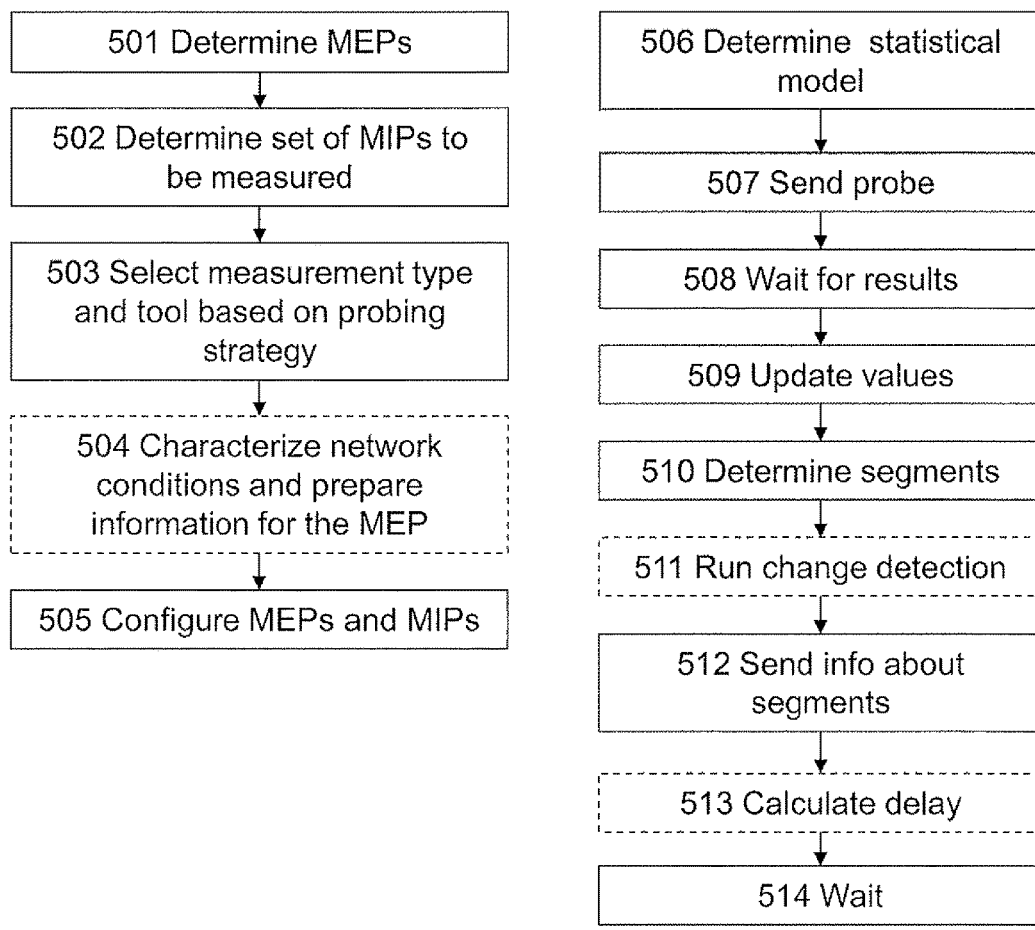
FIGS. 5a and 5b show schematic flowcharts illustrating methods according to embodiments herein.

With reference to FIGS. 5*a* and 5*b*, a further embodiment is described. In this example, the network entity 140 is an ingress MEP, which is an example of the first network node 110.

In this scenario, the network management node 150, such as a network management system (NMS), performs one or more of the following actions.

Action 501

The network management node 150 determines the ingress and egress MEPs.

Action 502

The network management node 150 determines a set of MIPs to be probed.

Action 603

The network management node 150 selects a measurement type (loss) and tool based on probing strategy. Probing strategy is one of single unicast packet, burst of unicast packets, or multicast packet on a point-to-point service, and is determined based on a table where each tool is associated to a probing strategy.

Action 504

The network management node 150 may characterize network conditions and prepare information for the MEP. The information may be, for example, which models are appropriate be used for this measurement session. A simple array of (model name, true/false) may be used to describe this.

Action 505

The network management node 150 configures the ingress and egress MEPs and the set of MIPs to be probed.

In co-operation with the network management node 150, the first network node 110 performs one or more of the following actions. Reference is now made to FIG. 5*b*.

Action 506

The first network node 110 determines statistical model, i.e. stationary, non-stationary, etc, based on measurement type, probing strategy and, optionally, information from the network management node 150.

Action 507

The first network node 110 sends probe(s) from ingress MEP to set of MIPs. Furthermore, the first network node 110 starts a timer for indicating time to receiver, a time_to_receive timer. In some examples, as a technical note, the time_to_receive is equal to delay_until.

Action 508

The first network node 110 waits to receive results, e.g. reports from the probes sent in action 507. When the first network node 110 has received reports from all probes the timer time_to_receive is stopped.

Action 509

The first network node 110 updates values while using the results.

For loss:

During stationary conditions: update values based on equation 1 or 2.

During non-stationary conditions: update values based on equation 1 or 2.

Action 510

The first network node 110 determines, or identifies, one or more segment with an updated value above a given threshold, or top N segments with losses above a given threshold.

Action 511

The first network node 110 may run change detection based on equation 4 and determine segments where changes are significant.

Action 512

The first network node 110 sends information about one or more segments to a user-interface device, such as a display or the like. In this manner, a human operator may be informed about degraded segments, e.g. by triggering an alarm sound, a visual alarm, a tactile alarm or the like.

Action 513

The first network node 110 may calculate a delay, delay_until_next, until sending the next probe by use of e.g. equation 5 and 6 below.

Action 514

The first network node 110 waits a period given by (delay_until_next-time_to_receive).

Actions 507 through action 514 are repeated until the measurement session is ended by the network management node 150.

Figure 6:
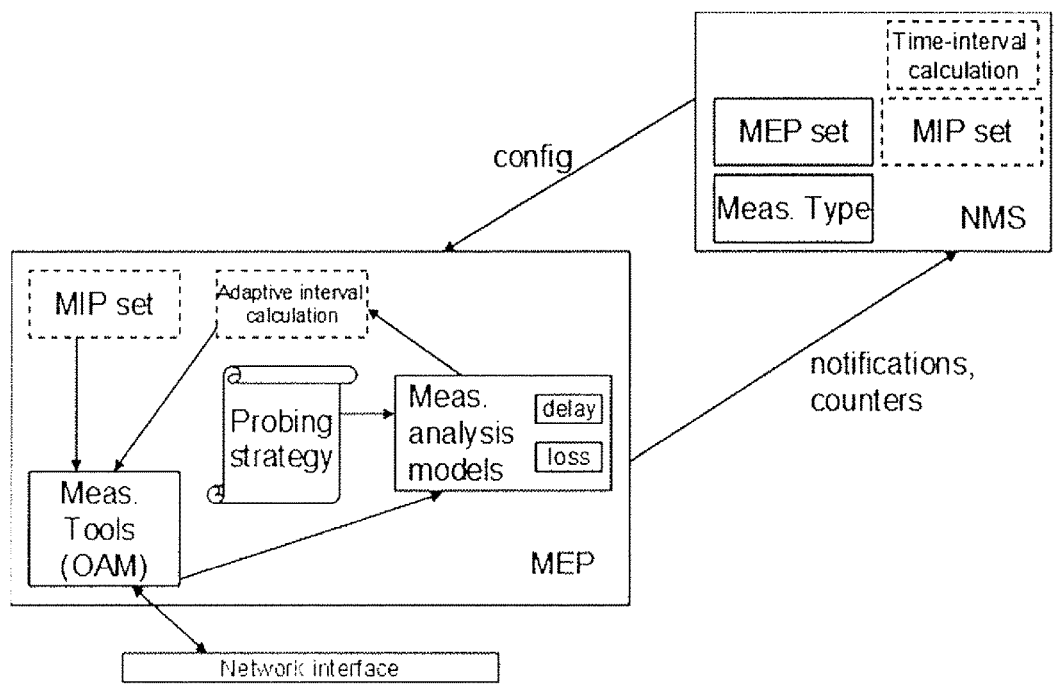
FIG. 6 is a schematic block diagram illustrating exemplifying network nodes according to embodiments herein.
Figures 7A, 7B:
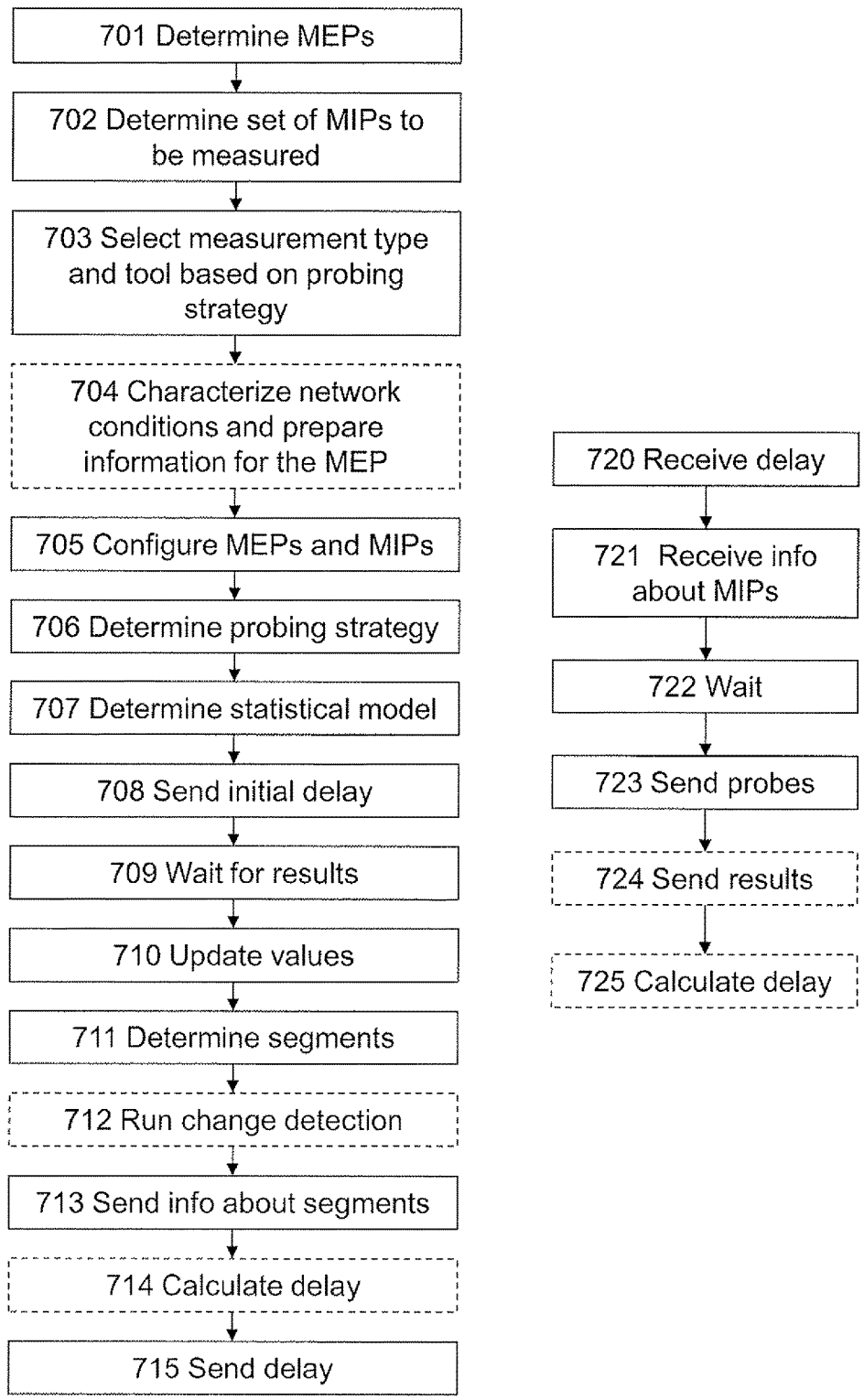
FIGS. 7a and 7b show schematic flowcharts illustrating methods according to embodiments herein.
Figure 8:
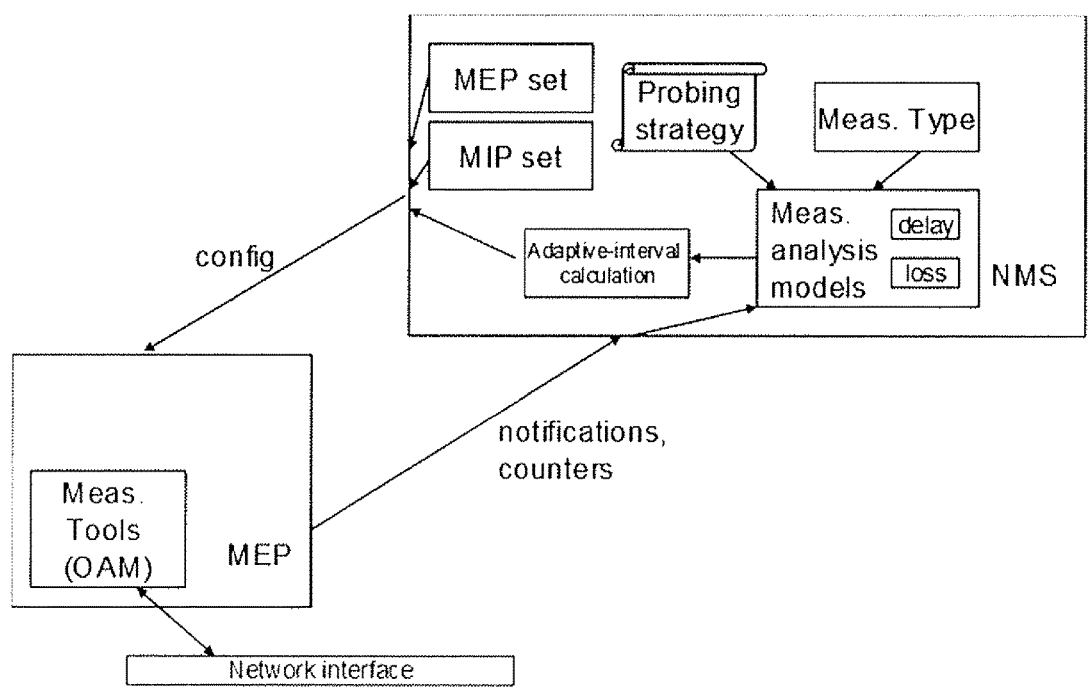
FIG. 8 is a schematic block diagram illustrating exemplifying network nodes according to embodiments herein.

FIGS. 6 and 8 show exemplifying ingress MEPs and exemplifying NMSs. In this way, briefly explain differences between the embodiments of FIG. 5 and FIG. 7 below may be illustrated. First, continuing with embodiments relating to FIG. 5 and then proceeding with embodiments relating to FIG. 7.

FIG. 6 shows an exemplifying ingress MEP and an exemplifying NMS, which are configured to perform the methods illustrated in FIGS. 5*a* and 5*b*.

The ingress MEP includes one or more electric circuits and/or software modules to handle measurement analysis models, adaptive interval calculation, communication with the NMS and the like.

Furthermore, the ingress MEP includes a set of measurement tools for OAM purposes.

The NMS includes information about MEPs and MIPs, measurement type. Moreover, the NMS includes electric circuits and/or software modules for calculating the time interval.

According to a further embodiment, as illustrated in FIG. 7*a*, the network entity 140 is a network management system, which is an example of the network management node 150.

The network management node 150 may perform one or more of the following actions.

Action 701

The network management node 150 determines the ingress and egress MEPs. This action is the same as action 501.

Action 702

The network management node 150 determines a set of MIPs to be probed. This action is the same as action 502.

Action 703

The network management node 150 selects a measurement type (loss) and tool based on probing strategy. Probing strategy is one of single unicast packet, burst of unicast packets, or multicast packet on a point-to-point service and is determined based on a table where each tool is associated to a probing strategy. This action is the same as action 503.

Action 704

The network management node 150 may characterize network conditions and prepare information for the MEP. The information may be, for example, which models are appropriate be used for this measurement session. A simple array of (model name, true/false) may be used to describe this. This action is the same as action 504.

Action 705

The network management node 150 configures the ingress and egress MEPs and the set of MIPs to be probed. This action is the same as action 505.

Action 706

The network management node 150 determines probing strategy based on existing tools for the measurements to be performed.

Action 707

The network management node 150 determines statistical model, such as stationary, non-stationary, etc, based on measurement type and probing strategy. This action is similar to action 506.

Action 708

The network management node 150 sends initial delay between pro-active measurements.

Action 709

The network management node 150 waits to receive results for the set of MIPs.

Action 710

The network management node 150 updates values.
For loss:
  During stationary conditions: update values based on equation 1 or 2.
  During non-stationary conditions: update values based on equation 1 or 2.

Action 711

The network management node 150 determines segments with updated values above a given threshold, or top N segments with losses above a given threshold.

Action 712

The network management node 150 may execute change detection based on equation 4 and determine link segments where changes are significant.

Action 713

The network management node 150 sends information about one or more segments to a user-interface device, such as a display or the like. In this manner, a human operator may be informed about degraded segments, e.g. by triggering an alarm sound, a visual alarm, a tactile alarm or the like.

Action 714

The network management node 150 may calculate delay until next probe using for example equation 5 and 6.

Action 715

The network management node 150 may send the delay calculated in action 714. The delay indicates time until next probe to ingress MEP.
Alternatively, the network management node 150 sends a new delay only if difference higher then threshold.
Actions 709 to 715 are repeated for each ingress MEP when multiple links are evaluated. For each evaluated link, there may be a respective model.

In co-operation with the network management node 150, the first network node 110 performs one or more of the following actions. Reference is now made to FIG. 7b.

Action 720

The first network node 110 receives an initial delay from the network management node 150. See action 708.

Action 721

The first network node 110 receives information about the set of MIPs from the network management node 150. The information about the set of MIPs may be sent by the network management node 150 in action 708.

Action 722

The first network node 110 waits a time interval given by the delay received in action 720 or 725.

Action 723

The first network node 110 sends probe(s) to the set of MIPs.

Action 724

The first network node 110 may report results from the probe(s) to the network management node 150.

Action 725

The first network node 110 may update the delay based information from the network management node 150. For example, the first network node 110 may check if it received updated delay information and if so the first network node 110 updates the delay. The updated delay is then used in action 722.
Actions 722 to 725 are repeated until the measurement session is ended by the network management node 150.

FIG. 8 shows an exemplifying ingress MEP and an exemplifying NMS, which are configured to perform the methods illustrated in FIGS. 7a and 7b.

In contrast to FIG. 6, the ingress MEP now includes one or more electric circuits and/or software modules to execute a set of measurement tools for OAM purposes. The one or more electric circuits and/or software modules relating to measurement analysis models, adaptive interval calculation have been removed.

The NMS includes information about MEPs and MIPs, measurement type. Moreover, the NMS includes electric circuits and/or software modules for calculating the time interval.

Moreover, in this embodiment, the also includes one or more electric circuits and/or software modules relating to measurement analysis models, adaptive interval calculation and the like.

In contrast to end-to-end based network tomography approaches, the embodiments herein uses the data provided by intermediary nodes, such as MIPs, resulting in the following advantages:

A reduction of the complexity in computing a set of measurements covering an end-to-end topology is achieved.

A reduced number of measurements for detection a condition on a link are needed. Detection of the condition, such as changes, degradations, modeling and localization, may be done based on already performed measurements. Thus, the need for additional diagnostic measurements is reduced. The adaptive delay based on the measurements reduces the link load induced by probes in comparison to use of fixed probing intervals.

The embodiments are reliable in stationary as well as non-stationary conditions.

In order to further illustrate examples, advantages and implementation of the embodiments disclosed, the following discussion is provided.

"P. Varga and I. Moldován. Integration of Service-Level Monitoring with Fault Management for End-to-End Multi-Provider Ethernet Services. IEEE Transactions on Network and Service Management 4(1) (2007) 28-38" describe a fault management framework for service-level monitoring in Ethernet services "R. Santitoro. Metro Ethernet Services—A Technical Overview. MEF, http://www.metroethernetforum.org.", based on recommended performance metrics defined in MEF 10.1 "Ethernet Services Attributes Phase 2, Metro Ethernet Forum, Technical Specification MEF 10.1, November 2006" and Y.1731 "ITU-T Rec. Y.1731, OAM-Functions and Mechanisms for EthernetBasedNetworks, February/2008". The framework is split in modules taking care of connectivity fault management, performance monitoring, service-level monitoring, and security. The performance monitoring is based on, among other things, periodic measurements of delays and drop.

Generally, trace-route OAM functions could suffice to measure the latency or drop, under the condition that a reply message is sent directly from each MIP back to the originating MEP (as in ETH-Trace, IP Trace-route or MPLS LSP Trace-route). A combined unicast/multicast based trace-route (with packet replication at each hop), similar to ETH-Trace, may be preferable as it effectively measures both drop and latency with small additional link load. Unicast based trace-route, with incremental probes such as in MPLS LSP or IP networks, can also be used, but may be less efficient in capturing small, quick variations in the network behavior, which may affect the estimations to some degree.

Alternatively, when it is of greater importance to capture small fluctuating variations, it may be necessary to implement a separate OAM probing function that periodically probes the connection with bursts of loopback (LB) messages (such as ETH-LBM, MPLS LSP LB etc). This provides more control over how the measurements are performed, in terms of transmission delays between probes and additional data exchanges if necessary (such as timestamps). An example of control protocol for a tool that uses bursts of packets, or "trains", is to be found in RFC 6802, Ericsson Two-Way Active Measurement Protocol (TWAMP) Value-Added Octets. The bursts of loopback messages, mentioned above, are related to a way of operating a tool, which usually sends only one packet. In order to generate a burst, the tool—usually sending only one packet—would be invoked multiple times, where each invocation of the tool follows a previous invocation directly, or immediately, without delay. Other tools include bursts natively, as specified in RFC6802.

In the previous work presented by Steinert and Gillblad "Long-term adaptation and distributed detection of local network changes. IEEE GLOBECOM 2010, Miami, Fla., USA. 2010" overlapping estimators were applied directly on latency measurements performed on one-hop connections between neighboring nodes. Here, each segment would instead be modeled with overlapping estimators such that probes can be sent with a variable delay based directly on expected link delay or on e.g. estimated Gamma parameters, as described in "Long term adaption and distributed detection of local network changes" as above and "A. G. Prieto, D. Gillblad, R. Steinert, A. Miron. TowardDecentralized Probabilistic Management. IEEE Communications Magazine. IEEE Communications Magazine, July 2011, volume 49, issue 7, pages 80-86". By allowing the probe interval to be set autonomously based on estimated parameters local network variations can be taken into account in a way that cannot be done with the use of fixed intervals.

In "R. Steinert and D. Gillblad. Link delay modeling and direct localization of performance degradations in transport networks. In Submitted to INFOCOM 2013. IEEE, 2012", statistical modeling of intermediate link delay and direct localization of link performance degradations were addressed, based on deriving link delay estimates from incremental end-to-end measurements. Two types of models were developed, targeting statistically stationary and non-stationary measurement conditions, combined with adaptive mechanisms that enable direct localization of performance changes.

The work by Steinert and Gillblad from 2010 and 2011, referred to in the preceding paragraph, applies to one link segment, generally between nodes that are directly connected. Depending on the network conditions, it would also apply to estimating the delay on the overall MEP-MEP connection and the ingress MEP—first MIP connection. However, these results cannot be used for estimating delays or loss for the segments between the MIPs, unless each MIP is made able to initiate active measurements. This would add a considerable management overhead and potentially cost to the nodes. The work submitted to INFOCOM 2013. IEEE in 2012, as mentioned above, extends the delay estimates to end-to-end paths, but does not address loss modeling and does not address the automation aspects of choosing the model adapted to the network conditions and removing the need to configure thresholds by using change detection.

As an example, probing intervals can be adjusted using a variable delay $\tau$ based on the aggregated expected latency obtained from the per segment $X_i$ estimated Gamma parameters $\Theta_i$ of the measured latencies (n is the number of segments):

$$\tau = \sum_{i=1}^{n} \tau(\Theta_i) = \sum_{i=1}^{n} c_i f_i^{-1}(p_i) \qquad \text{equation 5}$$

The probing delay is controlled with a cost $c_i$ and a fraction $p_i$ of the inverted cumulative density function $f_i^{-1}(p)$, based on the Gamma distribution P(t) of observed delays $\Delta t$:

$$f(\Delta t) = \int_0^{\Delta t} P(t) dt \qquad \text{equation 6}$$

The parameter c can be regarded as controlling the trade-off between the amount of induced link load and reaction time to observed delays, e.g. for decision-making of configuration changes. The fraction p represents the amount of probe responses that has been observed within a certain delay. See R. Steinert, D. Gillblad. Long-term adaptation and distributed detection of local network changes. IEEE GLOBECOM 2010, Miami, Fla., USA. 2010.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for evaluating a link between a first network node and a second network node, wherein the link is configured to carry data packets between the first and second network nodes via at least one third network node, wherein the link comprises at least a first segment configured to carry data packets between the first and third network nodes and a second segment configured to carry data packets between the second and third network nodes, the method comprising: obtaining an indication of a selected measurement tool, selected from a plurality of measurement tools, to be used in a measurement session for evaluation of the link; selecting a mathematical model, from a plurality of mathematical models, based on the indication of the selected measurement tool; obtaining a set of measurement results by executing the measurement session while using the selected measurement tool according to the indication of the selected measurement tool; determining a first and a second value relating to lost data packets of the first and second segments, respectively, based on the set of measurement results and the selected mathematical model; and determining whether at least one of the first and second segments is degraded or available based on the first and second values.

2. The method according to claim 1, wherein determining whether at least one of the first and second segments is degraded or available comprises selecting a predefined number of the first and second segments for which the respective first and second values are the greatest among the first and second values.

3. The method according to claim 1, wherein determining whether at least one of the first and second segments is degraded or available comprises selecting one of more of the first and second segments for which the respective first and second values are greater than a first predetermined threshold value for lost data packets.

4. The method according to claim 1, wherein determining whether at least one of the first and second segments is degraded or available comprises:
determining a respective value indicative of a change in terms of lost data packets for each of the first and second segments based on the first and second value, respectively; and selecting one or more of the first and second segments for which the respective value indicative of the change is greater than a second predetermined threshold value for change detection.

5. The method according to claim 1, further comprising: identifying the plurality of mathematical models adapted to the measurement session while taking into account whether data packets carried on the link are modeled under a statistical condition of stationarity or non-stationarity, wherein the selected mathematical model is selected from the plurality of mathematical models.

6. The method according to claim 1, wherein the link is a multi-segment Ethernet link, multi-segment Internet Protocol link, a multi-segment pseudo-wire or a MPLS-TP label switched path.

7. The method according to claim 1, wherein the selected mathematical model is equation 1 or 2, wherein:
equation 1 is $$E(X_i) = \frac{E(Y_i)}{E(Y_{i-1})},$$

and
equation 2 is $$E(X_i) = \frac{E(Y_i Y_{i-1}) - \text{Cov}(Y_i, Y_{i-1})}{E(Y_{i-1})^2},$$

where Xi is a segment, E(Xi) is the estimated success rate on the segment Xi,
E(Yi) is the observed success rate for link Yi, and Cov is covariance.

8. The method according to claim 1, being performed by a network entity.

9. The method according to claim 8, wherein the network entity is the first network node.

10. The method according to claim 9, wherein the obtaining of the indication of the selected measurement tool comprises receiving the indication of the selected measurement tool from a network management node.

11. The method according to claim 8, wherein the network entity is a network management node.

12. The method according to claim 11, wherein the obtaining of the indication of the selected measurement tool comprises receiving the indication of the selected measurement tool from an operator.

13. A network entity configured to evaluate a link between a first network node and a second network node, wherein the link is configured to carry data packets between the first and second network nodes via at least one third network node, wherein the link comprises at least a first segment a memory; a processing circuit configured to execute instructions contained in the memory which, when executed by the processing circuit, are configured to cause the network entity to: obtain an indication of a selected measurement tool, selected from a plurality of measurement tools, to be used in a measurement session for evaluation of the link; select a mathematical model, from a plurality of mathematical models, based on the indication of the selected measurement tool; obtain a set of measurement results by executing the measurement session while using the selected measurement tool according to the indication of the selected measurement tool; determine a first and a second value relating to lost data packets of the first and second segments, respectively, based on the set of measurement results and the selected mathematical model; and determine whether at least one of the first and second segments is degraded or available based on the first and second values.

14. The network entity according to claim 13, wherein the instructions, when executed by the processing circuit, are further configured to cause the network entity to determine whether at least one of the first and second segments is degraded or available by selecting a predefined number of the first and second segments for which the respective first and second values are the greatest among the first and second values.

15. The network entity according to claim 13, wherein the instructions, when executed by the processing circuit, are further configured to cause the network entity to determine whether at least one of the first and second segments is degraded or available by selecting one of more of the first and second segments for which the respective first and second values are greater than a first predetermined threshold value for lost data packets.

16. The network entity according to claim 13, wherein the instructions, when executed by the processing circuit, are further configured to cause the network entity to determine whether at least one of the first and second segments is degraded or available by:
determining a respective value indicative of a change in terms of lost data packets for each of the first and second segments based on the first and second value, respectively; and
selecting one or more of the first and second segments for which the respective value indicative of the change is greater than a second predetermined threshold value for change detection.

17. The network entity according to claim 13, wherein the instructions, when executed by the processing circuit, are further configured to cause the network entity to:
identify the plurality of mathematical models adapted to the measurement session while taking into account whether data packets carried on the link are modeled under a statistical condition of stationarity or non-stationarity, wherein the selected mathematical model is selected from the plurality of mathematical models.

18. The network entity according to claim 13, wherein the link is a multi-segment Ethernet link, multi-segment Internet Protocol link, a multi-segment pseudo-wire or a MPLS-TP label switched path.

19. The network entity according to claim 13, wherein the selected mathematical model is equation 1 or 2, wherein:
equation 1 is $$E(X_i) = \frac{E(Y_i)}{E(Y_{i-1})},$$

and
equation 2 is $$E(X_i) = \frac{E(Y_i Y_{i-1}) - \text{Cov}(Y_i, Y_{i-1})}{E(Y_{i-1})^2},$$

where Xi is a segment, E(Xi) is the estimated success rate on the segment Xi,
E(Yi) is the observed success rate for link Yi, and Cov is covariance.

20. The network entity according to claim 13, wherein the network entity is the first network node.

21. The network entity according to claim 13, wherein the network entity is a network management node.

22. The network entity according to claim 20, wherein the instructions, when executed by the processing circuit, are further configured to cause the network entity to receive the indication of the selected measurement tool from a network management node.

23. The network entity according to claim 21, wherein the instructions, when executed by the processing circuit, are further configured to cause the network entity to receive the indication of the selected measurement tool from an operator.

* * * * *